(12) United States Patent
Dwyer et al.

(10) Patent No.: US 10,115,530 B2
(45) Date of Patent: Oct. 30, 2018

(54) SOLAR CELL AND METHODS OF FABRICATION AND USE THEREOF

(71) Applicant: SEQUENCE DESIGN LTD., Northport, NY (US)

(72) Inventors: Aidan Rhys Dwyer, Northport, NY (US); Sean Patrick Dwyer, Northport, NY (US)

(73) Assignee: SEQUENCE DESIGN LTD., Northport, NY (US)

( * ) Notice: Subject to any disclaimer, the term of this patent is extended or adjusted under 35 U.S.C. 154(b) by 157 days.

(21) Appl. No.: 15/087,384

(22) Filed: Mar. 31, 2016

(65) Prior Publication Data
US 2016/0293343 A1   Oct. 6, 2016

Related U.S. Application Data

(60) Provisional application No. 62/178,095, filed on Apr. 1, 2015.

(51) Int. Cl.
*H01G 9/20* (2006.01)

(52) U.S. Cl.
CPC .......... *H01G 9/2027* (2013.01); *Y02E 10/542* (2013.01); *Y02P 70/521* (2015.11)

(58) Field of Classification Search
None
See application file for complete search history.

(56) References Cited

U.S. PATENT DOCUMENTS 5,350,644 A    9/1994   Graetzel et al.

OTHER PUBLICATIONS

Dwyer, Aidan Fueling the World One Layer at a Time: Improving the Efficiency of the Gratzel Cell with Nanotechnology, May 10-15, 2015 (Year: 2015).*

* cited by examiner

*Primary Examiner* — Shannon M Gardner
(74) *Attorney, Agent, or Firm* — John M. Hammond; Patent Innovations LLC

(57) ABSTRACT

An energy conversion device comprising a first electrically conductive layer, a mesoporous oxide layer contiguous with the first electrically conductive layer and comprised of volcanic ash particles and photoactive dye molecules adsorbed on the ash particles, an electrolyte layer contiguous with the mesoporous oxide layer and comprised of a redox mediator, a catalyst layer comprised of an electrically conductive catalyst material, and a second electrically conductive layer contiguous with the catalyst layer. The electrically conductive catalyst material may be graphene, graphite, platinum, or carbon. The device may be further comprised of a light transmissive substrate contiguous with the first electrically conductive layer. The mesoporous oxide layer may be further comprised of titanium dioxide particles. The volcanic ash may comprise a mixture of particles from different indigenous sources of volcanic ash. Methods of fabrication of the device and conversion of light energy to electrical energy using the device are also disclosed.

11 Claims, 8 Drawing Sheets

SOLAR CELL AND METHODS OF FABRICATION AND USE THEREOF

CROSS-REFERENCE TO RELATED PATENT APPLICATIONS

This application claims priority from U.S. Provisional Patent Application No. 62/178,095, filed Apr. 1, 2015, the disclosure of which is incorporated herein by reference.

BACKGROUND

Technical Field

Devices for conversion of solar energy to electrical energy, and methods of fabricating such devices. In particular, a solar cell including constituents from volcanic ash, and related methods of fabrication of the solar cell.

Description of Related Art

A nano-crystalline dye sensitized solar cell, or "DSSC," is a photo electrochemical cell that uses photons to excite electrons in organic dyes. This process, in turn, creates electrical power. Unlike conventional photovoltaic (PV) cells that use silicon as a primary ingredient, a typical DSSC uses titanium dioxide ($TiO_2$) as a constituent in its construction. In addition to $TiO_2$, DSSC technology relies upon carbon or graphite as additional elements in its operation. The DSSC may emerge as the next generation of PV cells to produce cheaper sources of solar energy. The DSSC has the potential to provide power efficiency, low cost of manufacturing, and a relatively short payback time in energy production.

The promise of DSSC technology, however, faces technical challenges. For example, conventional DSSC devices have lower efficiency values than conventional PV cells. In contrast to conventional cells, the DSSC is a photoelectrochemical cell. FIG. 1 depicts a cross-sectional schematic view of a portion conventional dye sensitized solar cell 10. A typical DSSC is comprised of a series of thin film coatings (also referred to herein as layers) formed upon a glass substrate 20. The layers include a first conductive layer 30 operable as an anode of the cell, a charge blocking layer 40, a hole conducting layer 50, and a second conductive layer 60 operable as an anode of the cell. The device 10 may include an additional transparent protective layer (not shown), such as a glass layer, that is contiguous with the second conductive layer 60.

The first and second conductive layers that function as electrodes are comprised of light transmissive conductive materials, such as tin dioxide ($SnO_2$). The charge blocking layer 40 is also of a light transmissive material. In that manner, light that is incident on the cell 10 may propagate through conductive layer 60; and optionally, depending upon the positioning of the cell in its environment, also through conductive layer 30 and blocking layer 40.

The hole transporting layer 50 is comprised of one or more sub-layers containing a suspension of nanometer size particles 52 of titanium dioxide ($TiO_2$) that is distributed uniformly therethrough. The titanium dioxide particles are in close proximity to and are exposed to an organic dye 54, such as an organometallic complex or a green chlorophyll derivative, also contained in the one or more sublayers. A variety of other natural dyes may be utilized, provided that they include a chemical group that can attach to the semiconductor ($TiO_2$) particle surface and have energy levels at the proper band levels necessary for electron injection and sensitization. In the operation of the cell, a single layer of dye molecules attaches to each particle of the $TiO_2$ and acts as an absorber of incident light. A liquid electrolyte (not shown), such as iodine, is applied to the $TiO_2$-containing sublayer(s) and percolates into them. A counter electrode wafer of conductive glass coated with graphite, carbon, or platinum, and which includes the second conductive layer 60, completes the device 10.

It is to be understood that for the sake of brevity, the above description and the schematic diagram of cell 10 in FIG. 1 have been simplified. Further details on the structure and operation of a conventional DSSC may be found in, e.g., U.S. Pat. No. 5,350,644 of Graetzel et al., the disclosure of which is incorporated herein by reference.

The conversion efficiency of a solar cell is the maximum electrical power output divided by the incoming solar power on the same area. Not all of the energy from sunlight can be converted into electrical energy. Some of the sunlight is converted into heat. To the best of the Applicant's knowledge, the overall sunlight to electrical energy conversion efficiency of a DSSC using the best dyes currently available is 7 to 10% under direct sunlight. This is to be compared to 0.5% for natural photosynthesis and 12 to 20% for commercial silicon solar cell modules. One process that limits the efficiency of a DSSC is the transfer of the injected electron to the oxidized mediator before the electron has been collected and passed through the load and counter electrode.

Even with these limitations, the spectrum of light utilized by conventional dyes indicates that a DSSC of at least 10% efficiency could be realized at a cost of $0.60 per watt. This is competitive with conventional power generation and illustrates the promise of DSSC technology. DSSC technology is particularly viewed as a promising source of energy for developing areas because of its reduced costs. However, the discovery of alternative materials that produce improved energy conversion and environmentally sensitive results are needed, and would have a highly beneficial impact. Such a breakthrough in DSSC design would open up a new source of affordable and sustainable power.

SUMMARY

The present invention meets this need by providing energy conversion devices and methods of fabrication and use thereof. The devices utilize volcanic ash and graphene as active materials in layers to improve the performance of a dye sensitized solar cell. The Applicant has discovered that volcanic ash or a mixture of volcanic ashes can be utilized as a substitute for titanium dioxide in the mesoporous oxide layer and the substrate for the photoactive mesoporous oxide layer in a DSSC. In certain embodiments, a proportional mixture of volcanic ash and titanium dioxide may be utilized in the mesoporous oxide layer and the substrate for the photoactive mesoporous oxide layer in a DSSC. In certain embodiments, graphene may be utilized as a substitute to graphite, platinum, carbon or other conductive material as a catalyst layer on a transparent conducting oxide, thereby functioning as a counter electrode. Additionally, graphene may be used in the counter electrode in conjunction with aluminum or other conductive elements. In certain embodiments, volcanic ash in a device may be used together or independently with combinations of titanium dioxide or graphite, platinum or carbon. In certain embodiments, one may prepare and use "synthetic" volcanic ash, i.e., a mixture of inorganic salt and/or mineral constituents that are the same as what is found in natural volcanic ash. The use of such synthetic volcanic ash is to be considered as being within the scope of the present invention.

More particularly, in accordance with the present disclosure, an energy conversion device is provided. The device is comprised of a first electrically conductive layer, a mesoporous oxide layer contiguous with the first electrically conductive layer and comprised of volcanic ash particles and photoactive dye molecules adsorbed on the ash particles, an electrolyte layer contiguous with the mesoporous oxide layer and comprised of a redox mediator, a catalyst layer comprised of an electrically conductive catalyst material, and a second electrically conductive layer contiguous with the catalyst layer.

In certain embodiments, the electrically conductive catalyst material may be graphene. In other embodiments, the electrically conductive catalyst material may be selected from graphite, platinum, or carbon. The device may be further comprised of a light transmissive substrate contiguous with the first electrically conductive layer.

In certain embodiments, the mesoporous oxide layer may be further comprised of titanium dioxide particles. In one exemplary embodiment, the mesoporous oxide layer may be comprised of particles at a ratio of 80 weight percent volcanic ash to 20 weight percent titanium dioxide. In certain embodiments, the volcanic ash may comprise a mixture of particles from different indigenous sources of volcanic ash.

In certain embodiments, the device may be further comprised of a separator between the electrolyte layer and the catalyst layer. In certain embodiments, the redox mediator may be iodine. In certain embodiments, the first and second electrically conductive layers may be comprised of a transparent conducting oxide.

In accordance with the present disclosure, a method for making an energy conversion device is also provided. The method is comprised of depositing a first electrically conductive layer on a supporting substrate; grinding volcanic ash into particles having a size of less than 1000 nanometers; forming a suspension of the volcanic ash particles in a carrier fluid; forming a mesoporous oxide layer contiguous with the first electrically conductive layer containing the volcanic ash particles by coating the first electrically conductive layer with the suspension of the volcanic ash particles; depositing a layer comprising photoactive dye molecules on the mesoporous oxide layer and adsorbing the photoactive dye molecules onto the volcanic ash particles; depositing an electrolyte layer comprised of a redox mediator onto the mesoporous oxide layer; depositing a catalyst layer comprised of an electrically conductive catalyst material; and depositing a second electrically conductive layer on the catalyst layer. The method may be further comprised of forming a separator between the electrolyte layer and the catalyst layer.

In accordance with the present disclosure, a method for light energy to electrical energy is also provided. The method is comprised of forming an energy conversion device as described above; exposing the energy conversion device to incident light to cause generation of excited electrons and holes in the mesoporous oxide layer; injecting the excited electrons into conduction bands of constituent materials of the particles of volcanic ash; and conducting the electrons to the first electrode and causing the holes to be transported to the second electrode to produce an electrical potential between the first electrically conductive layer and the second electrically conductive layer.

The method may further comprise connecting a first electrical conductor to the first electrically conductive layer, and a second electrical conductor to the second electrically conductive layer. The first electrical conductor and the second electrical conductor may be connected to an electrical load, rendering the electrical load operable by receiving the electrical energy. The electrical load may be a light source, a motor, or other electrical load including resistors, capacitors, inductors, and combinations thereof. The first electrical conductor and the second electrical conductor may be connected to an electrical power grid.

BRIEF DESCRIPTION OF THE DRAWINGS

The present disclosure will be provided with reference to the following drawings, in which like numerals refer to like elements, and in which.

DETAILED DESCRIPTION

Figure 1:
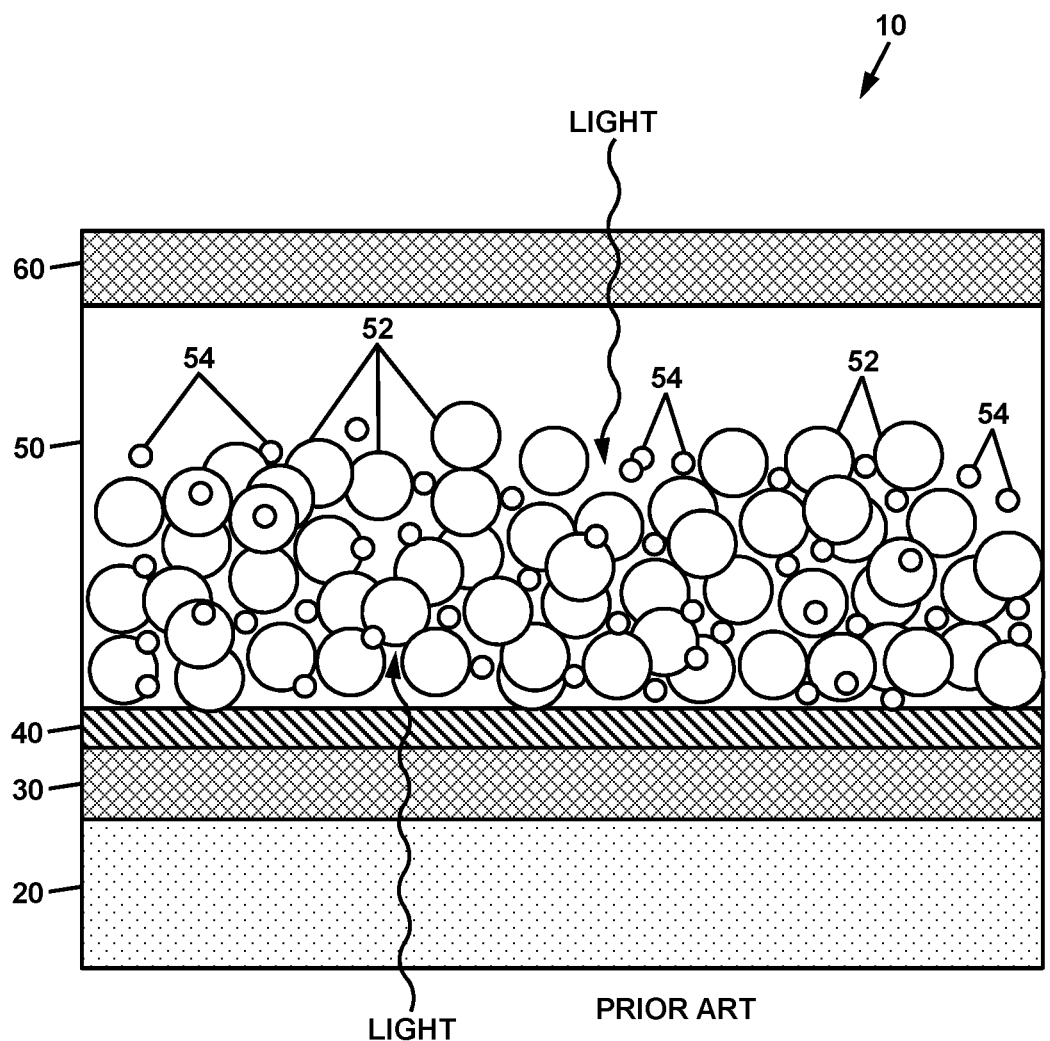
FIG. 1 is a schematic illustration depicting the materials and layered structure of a conventional dye sensitized solar cell.

While invention described herein contains specificities, these should not be construed as limitations on the scope of the invention, but rather exemplifications of several preferred embodiments thereof. Although the present invention is described with reference to preferred embodiments, those skilled in the art will recognize that changes may be made in form and detail without departing from the spirit and scope of the invention. Accordingly, the scope of the invention should be determined not by the embodiments discussed or illustrated, but by the appended claims and their legal equivalents.

For a general understanding of the present invention, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

In the following disclosure, the present invention is described in the context of its use as a solar cell. However, it is not to be construed as being limited only to use in solar energy conversion applications. The invention is adaptable to any use in which conversion of light energy to electrical energy is desirable to be provided from a photovoltaic device. Additionally, the description identifies certain components with the adjectives "top," "upper," "bottom," "lower," "left," "right," etc. These adjectives are provided in the context of use of the device as an upwardly facing solar cell, and in the context of the orientation of the drawings, which is arbitrary. The description is not to be construed as limiting the device to use in a particular spatial orientation.

The instant energy conversion device may be used in orientations other than those shown and described herein.

Prior to the disclosure herein of dye sensitized solar cell devices of the present invention, a summary of certain materials used in such devices will be presented as follows.

As used herein, the term "mesoporous" is used to refer to a material containing pores with diameters between 2 and 50 nanometers.

Graphene is an allotrope of carbon in the form of a two-dimensional, atomic-scale, hexagonal lattice in which one carbon atom forms each vertex of the lattice. It is the basic structural element of other allotropes, including graphite, charcoal, carbon nanotubes, and fullerenes. Each atom of graphene has four bonds: one σ bond with each of its three neighbors, and one π bond that is oriented out-of-plane. The atoms of graphene are about 1.42 Å (Angstroms) apart. The hexagonal lattice of graphene can be regarded as two interleaving triangular lattices. Graphene's stability is due to its tightly packed carbon atoms and an $sp^2$ orbital hybridization—a combination of orbitals $p_x$ and $p_y$ that constitute the σ-bond. The final $p_z$ electron makes up the π-bond. The π-bonds hybridize together to form the π-band and π*-bands. These bands are responsible for most of graphene's notable electronic properties, via the half-filled band that permits free-moving electrons.

Graphene has many extraordinary properties. It is about 100 times stronger than steel by weight, conducts heat and electricity with great efficiency, and is nearly transparent. These properties include the bipolar transistor effect, ballistic transport of charges, and large quantum oscillations in the material. Graphene has a theoretical specific surface area (SSA) of 2630 $m^2/g$. This is much larger than that reported to date for carbon black (typically smaller than 900 $m^2/g$), or for carbon nanotubes (CNTs) ranging from about 100 to 1000 $m^2/g$, and is similar to activated carbon. Graphene is the only form of carbon (or solid material in general) in which every atom is available for chemical reaction from two sides (due to the 2D structure).

Graphene is a zero-gap semiconductor, because its conduction and valence bands meet at the Dirac points. The Dirac points are six locations in momentum space, on the edge of the Brillouin zone, divided into two non-equivalent sets of three points. The two sets are labeled K and K'. The sets give graphene a valley degeneracy of gv=2. By contrast, for traditional semiconductors, the primary point of interest is generally Γ, where momentum is zero. Four electronic properties separate it from other condensed matter systems.

Volcanic ash is typically formed of small jagged pieces of rocks, minerals, and volcanic glass the size of sand and silt (less than 2 millimeters or 1/12 inch in diameter). Very small ash particles can be less than 0.001 millimeters (about 0.00004 inch) across. Volcanic ash is hard, does not dissolve in water, is extremely abrasive and mildly corrosive, and, most significantly, conducts electricity when exposed to moisture.

Volcanic ash has remarkable properties similar to $TiO_2$, both in its nanocrystalline consistency, and its potential use as a semi-conductor. The types of minerals present in volcanic ash are dependent on the chemistry of the magma from which it was formed during a volcanic eruption. Considering that the most abundant elements found in magma are silica ($SiO_2$) and oxygen, the various types of magma (and therefore ash) produced during volcanic eruptions are most commonly understood in terms of their silica content. Low energy eruptions of basalt produce a characteristically dark colored ash containing about 45-55% silica that is generally rich in iron (Fe) and magnesium (Mg). The most explosive rhyolite eruptions produce a felsic ash that is high in silica (>69%) while other types of ash with an intermediate composition (e.g., andesite or dacite) have a silica content between 55-69%.

A range of sulfate and halide (primarily chloride and fluoride) compounds are readily mobilized from fresh volcanic ash. These salts are formed as a consequence of rapid acid dissolution of ash particles within eruption plumes, which supplies the cations involved in the deposition of sulfate and halide salts.

While some 55 types of ions may be in fresh ash leachates, the most abundant are the cations $Na^+$, $K^+$, $Ca^{2+}$, and $Mg^{2+}$, and the anions $Cl^-$, $F^-$ and $SO_4^{2-}$. Molar ratios between ions present in leachates suggest that in many cases these elements are present as simple salts such as NaCl and $CaSO_4$. As an example, ash from the 1980 eruption of Mount St. Helens contains readily soluble chloride salts, followed by sulfate salts. Fluoride compounds are in general only sparingly soluble (e.g., $CaF_2$, $MgF_2$), with the exception of fluoride salts of alkali metals and compounds such as calcium hexafluorosilicate ($CaSiF_6$). The pH of fresh ash leachates is highly variable, depending on the presence of an acidic gas condensate (primarily as a consequence of the gases $SO_2$, HCl and HF in the eruption plume) on the ash surface.

When dry, the crystalline-solid structure of the salts acts more as an insulator than a conductor. However, once the salts are dissolved into a solution by a source of moisture, the ash becomes electrically conductive. The electrical conductivity of volcanic ash increases with (1) increasing moisture content; (2) increasing soluble salt content; and (3) increasing compaction (bulk density).

The Applicant has discovered that these properties of volcanic ash may be used advantageously when volcanic ash is incorporated into a dye sensitized solar cell. Certain embodiments of such cells and methods of fabrication thereof will now be described with reference to FIGS. 2-7. It is to be understood that the DSSC devices depicted in FIGS. 2-7 are shown schematically. Although the various layers of the devices appear to be approximately equal in thickness, such an inference is not to be made. The various layers of the devices are not shown to scale. Additionally, details on the methods of deposition of the various layers are not provided herein. Suitable thin film deposition methods for the various layers, such as physical and/or chemical vapor deposition, sputtering, epitaxy, sol-gel coating, and the like will be apparent to those skilled in the art.

Figure 2:
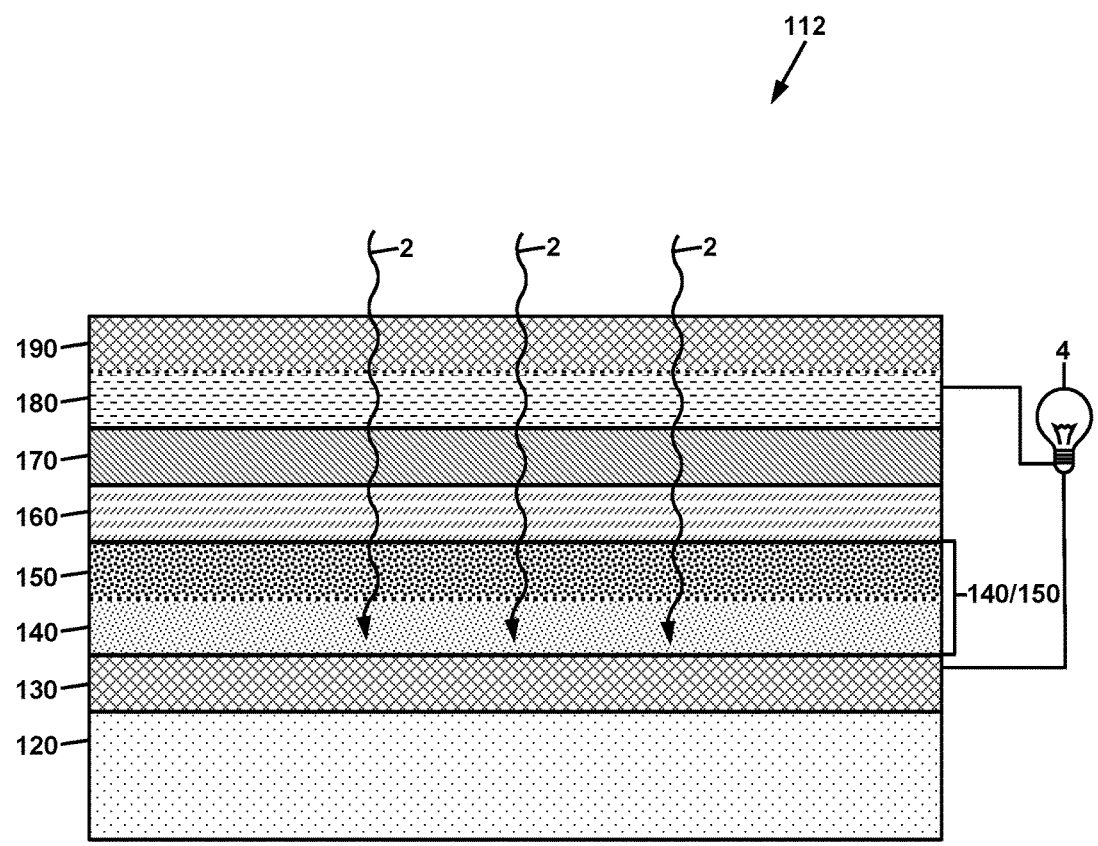
FIG. 2 is a schematic illustration of a first embodiment of a dye sensitized solar cell of the present disclosure.

FIG. 2 is a schematic representation of a first embodiment of a DSSC device 112 in accordance with the present disclosure. DSSC 112 is comprised of a glass substrate 120, a first electrically conductive layer 130 containing a transparent conducting oxide and functioning as a first working electrode, a mesoporous oxide layer 140 containing volcanic ash, a photoactive mesoporous oxide layer 150 containing dye molecules; a layer 160 of electrolyte with redox mediators such as iodine solution; a separator layer 170; a catalyst layer 180 comprised of graphene; and a second electrically conductive layer 190 containing a transparent conducting oxide. Together, the catalyst layer 180 and electrically conductive layer 190 function as a second working electrode, or "counter" electrode. A transparent protective layer (not shown) of glass that is contiguous with the second electrode 180/190 may also be provided in this embodiment, and in embodiments described subsequently.

In certain embodiments, the graphene in the counter-electrode may first be distributed uniformly on the second conductive layer 190, which may be a metal such as aluminum, nickel, or copper, instead of a conductive oxide deposited on a glass or other transparent substrate. In certain embodiments, the substrate 120 may be made of an alternative transparent material such as plastic polymers or other transparent materials instead of a glass substrate.

In certain embodiments, the volcanic ash electrode may be used in combination with a conventional counter electrode comprised of graphite, carbon platinum or other suitable materials in place of a counter electrode comprised of graphene. In certain embodiments, the volcanic ash electrode and graphene counter electrode structure may be combined and interchanged with conventional compositions and other variations of DSSC electrodes and counter electrodes.

Figure 3:
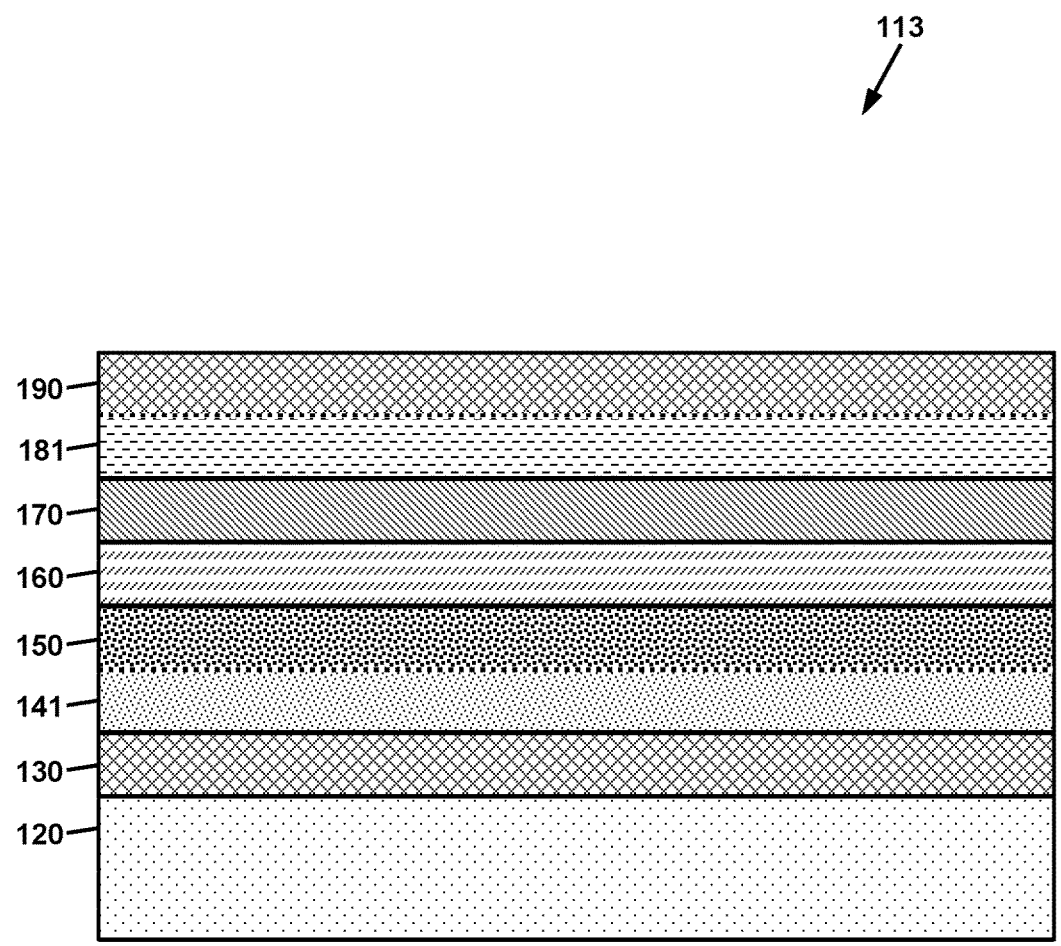
FIG. 3 is a schematic illustration of a second embodiment of a dye sensitized solar cell of the present disclosure.

FIG. 3 is a schematic representation of a second embodiment of a DSSC device 113. DSSC 113 is comprised of a glass substrate 120, a first electrically conductive layer 130 containing a transparent conducting oxide and functioning as a first working electrode, a mesoporous oxide layer 141 containing a mixture of volcanic ash and titanium dioxide, a photoactive mesoporous oxide layer 150 containing dye molecules; a layer 160 of electrolyte with redox mediators such as iodine solution; a separator level 170; a catalyst layer 181 comprised of graphite, platinum or carbon; and a second electrically conductive layer 190 containing a transparent conducting oxide, the layers 181 and 190 functioning as a second working electrode. In one exemplary embodiment, the mixture of volcanic ash and titanium dioxide may contain 80 weight percent volcanic ash and 20 weight percent titanium dioxide.

Figure 4:
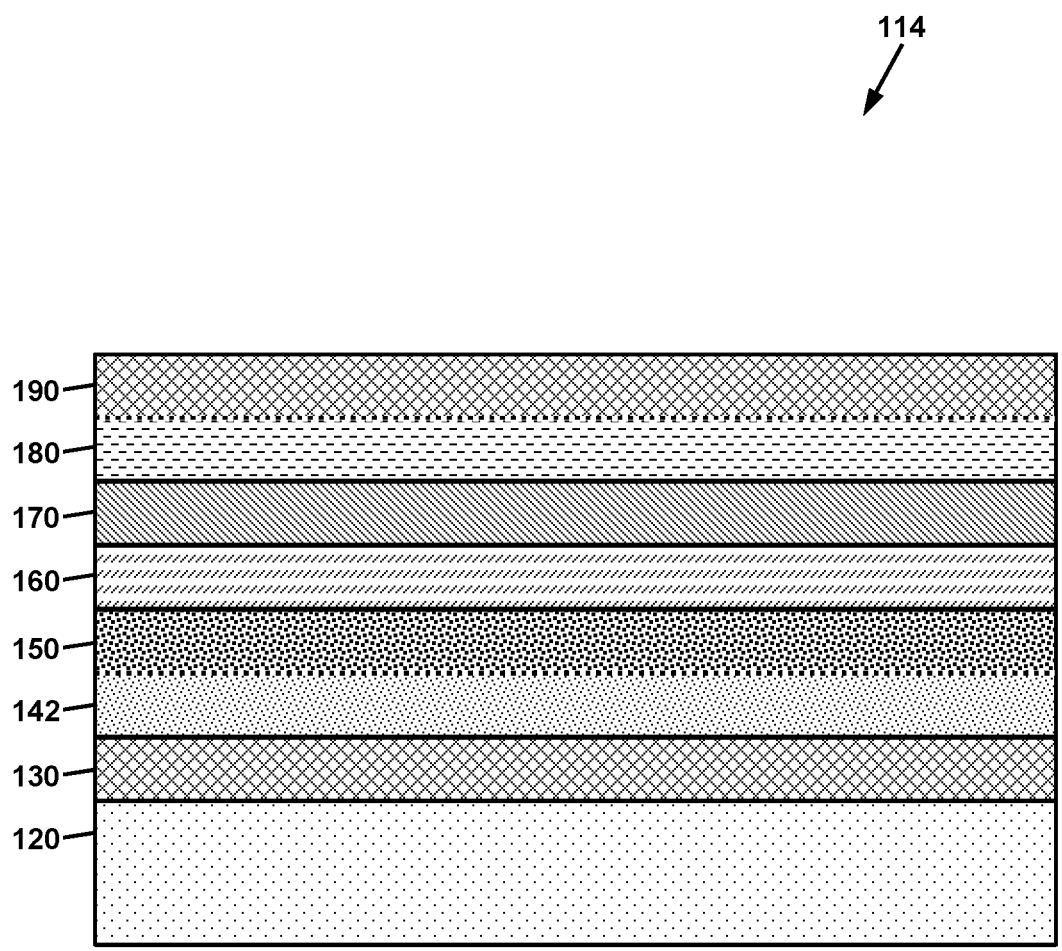
FIG. 4 is a schematic illustration of a third embodiment of a dye sensitized solar cell of the present disclosure.

FIG. 4 is a schematic representation of a third embodiment of a DSSC device 114. DSSC 114 is comprised of a glass substrate 120, a first electrically conductive layer 130 containing a transparent conducting oxide and functioning as a first working electrode, a mesoporous oxide layer 142 containing a proportional mix of volcanic ash and titanium dioxide; a photoactive mesoporous oxide layer 150 containing dye molecules; a layer 160 of electrolyte with redox mediators such as iodine solution; a separator layer 170; a catalyst layer 180 comprised of graphene; and a second electrically conductive layer 190 containing a transparent conducting oxide, the layers 180 and 190 functioning as a second working electrode. In the cell 114 of FIG. 4 (and cell 117 of FIG. 7 described subsequently), rather than using a single type of volcanic ash, a proportional mixture of different types of volcanic ash may be used. The different types of volcanic ash may be obtained from different indigenous volcanic sources. Such different types of volcanic ash include, but are not limited to, those described previously in this disclosure. Specific proportions of the individual volcanic ashes may vary widely. The proportional mixtures of volcanic ash may be used in combination with titanium dioxide, or without titanium dioxide.

Figure 5:
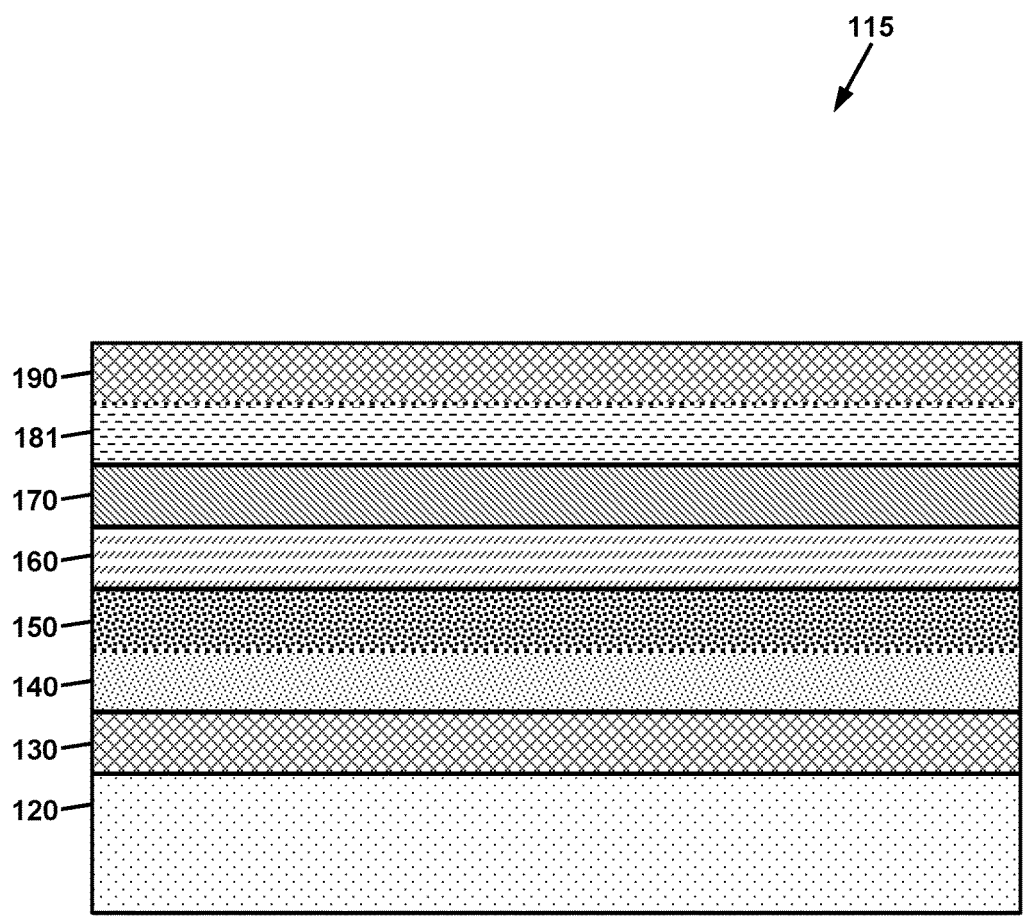
FIG. 5 is a schematic illustration of a fourth embodiment of a dye sensitized solar cell of the present disclosure.

FIG. 5 is a schematic representation of a fourth embodiment of a DSSC device 115. DSSC 115 is comprised of a glass substrate 120, a first electrically conductive layer 130 containing a transparent conducting oxide and functioning as a first working electrode, a mesoporous oxide layer 140 containing volcanic ash, a photoactive mesoporous oxide layer 150 containing dye molecules; a layer 160 of electrolyte with redox mediators such as iodine solution; a separator layer 170; a catalyst layer 181 comprised of graphite, platinum or carbon; and a second electrically conductive layer 190 containing a transparent conducting oxide, the layers 181 and 190 functioning as a second working electrode.

Figure 6:
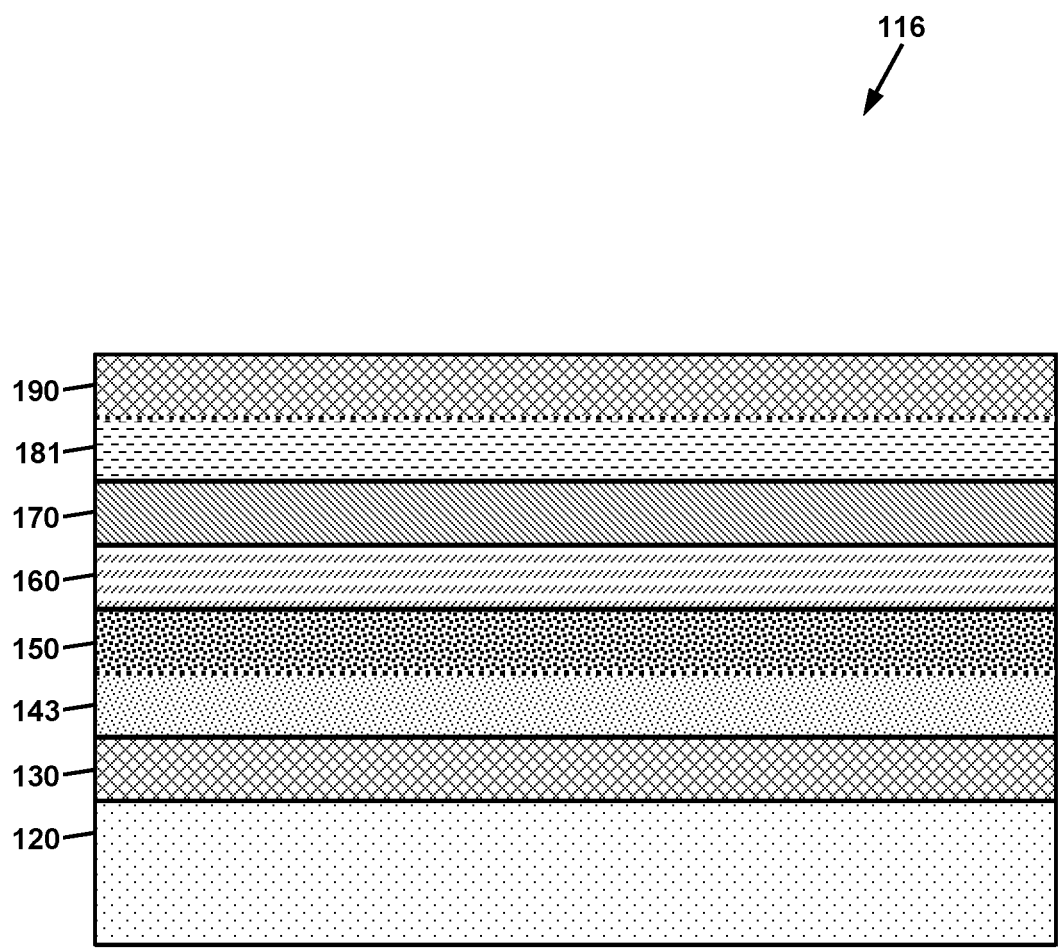
FIG. 6 is a schematic illustration of a fifth embodiment of a dye sensitized solar cell of the present disclosure.

FIG. 6 is a schematic representation of a fifth embodiment of a DSSC device 116. DSSC 116 is comprised of a glass substrate 120, a first electrically conductive layer 130 containing a transparent conducting oxide and functioning as a first working electrode, a mesoporous oxide layer 143 containing a mixture of volcanic ashes of different compositions, a photoactive mesoporous oxide layer 150 containing dye molecules; a layer 160 of electrolyte with redox mediators such as iodine solution; a separator layer 170; a catalyst layer 181 comprised of graphite, platinum or carbon; and a second electrically conductive layer 190 containing a transparent conducting oxide, the layers 181 and 190 functioning as a second working electrode.

Figure 7:
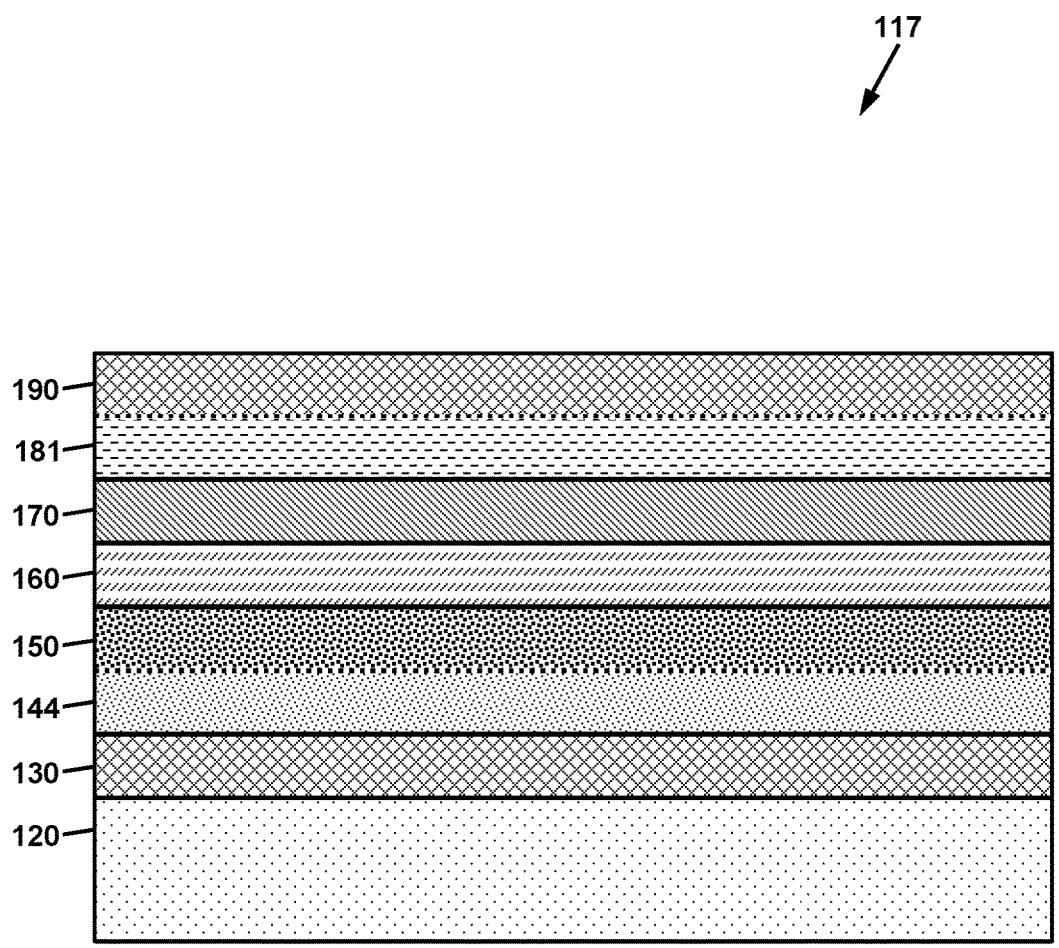
FIG. 7 is a schematic illustration of a sixth embodiment of a dye sensitized solar cell of the present disclosure.

FIG. 7 is a schematic representation of an sixth embodiment of a DSSC device 117. DSSC 117 is comprised of a glass substrate 120, a first electrically conductive layer 130 containing a transparent conducting oxide and functioning as a first working electrode, a mesoporous oxide layer 144 containing a proportional mixture of volcanic ashes of different compositions and titanium dioxide, a photoactive mesoporous oxide layer 150 containing dye molecules; a layer 160 of electrolyte with redox mediators such as iodine solution; a separator layer 170; a catalyst layer 181 comprised of graphite, platinum or carbon; and a second electrically conductive layer 190 containing a transparent conducting oxide, the layers 181 and 190 functioning as a second working electrode.

Figure 8:
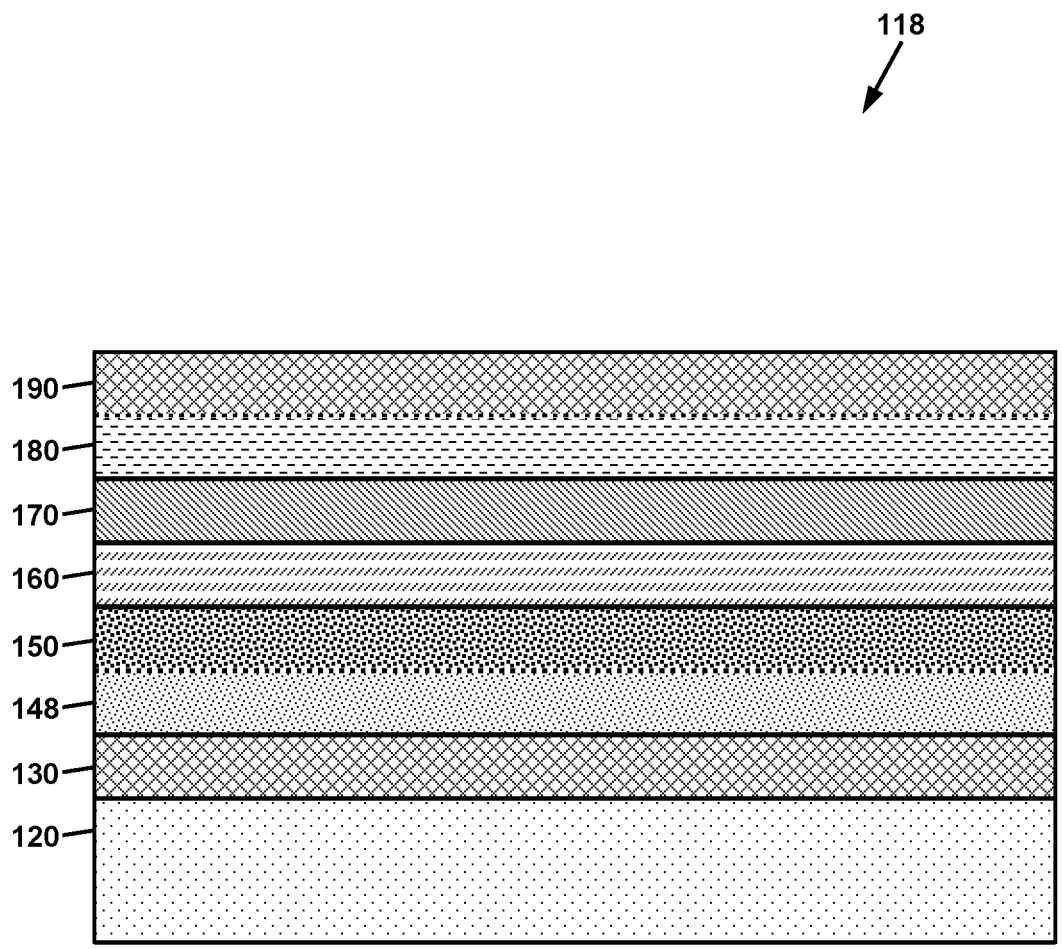
FIG. 8 is a schematic illustration of a dye sensitized solar cell fabricated without volcanic ash as a mesoporous oxide layer for the purposes of acting as a control sample in experimental testing.

FIG. 8 is a schematic representation of a DSSC device 118, which was fabricated without volcanic ash as a mesoporous oxide layer for the purposes of acting as a control sample in experimental testing. DSSC 118 is comprised of a glass substrate 120, a first electrically conductive layer 130 containing a transparent conducting oxide and functioning as a first working electrode, a mesoporous oxide layer 148 containing titanium dioxide, a photoactive mesoporous oxide layer 150 containing dye molecules; a layer 160 of electrolyte with redox mediators such as iodine solution; a separator layer 170; a catalyst layer 180 comprised of graphene; and a second electrically conductive layer 190 containing a transparent conducting oxide, the layers 180 and 190 functioning as a second working electrode.

A method of constructing a dye sensitized solar cell of the present disclosure will now be described with reference in particular to the cell 112 of FIG. 2. It is to be understood that the following description is applicable to cells 113-117 of FIGS. 3-7 as well as cell 112.

Referring now to FIG. 2, the fabrication of the DSSC 112 begins with the deposition of the first electrically conductive layer 130 containing a transparent conducting oxide as a first electrode on the substrate 120. Suitable conductive oxides include tin dioxide ($SnO_2$). Other suitable transparent oxides with sufficient conductivity include indium tin oxide (ITO), $TiO_2$, $ZnO_2$, $SnO_2$, and $Nb_2O_5$, as well as certain chalcogenides such as CdSe.

The conductive layer 130 may be formed by various thin film deposition processes. In one exemplary embodiment, a suspension of fluorine doped tin oxide was coated on a glass substrate panel using a doctor blade. The coating was dried, and then annealed to the conductive panel by heating the panel in a lab furnace at 450 degrees Celsius for half an hour. The resulting conductive layer had a dry thickness of between 100 and 300 micrometers (μm). Alternatively, the suspension may be coated onto the substrate by other coating methods such as spin, dip, or spray coating. Preferably, the conductive layer is provided with a thickness of less than 400 μm.

Prior to deposition of the mesoporous oxide layer 140 containing volcanic ash, the volcanic ash is ground into a powder of nanometer size particles by suitable attrition means such as a ball mill. Volcanic ash may be comprised of volcanic glass shards, pumice, crystals, minerals, and other rock fragments ranging in density of individual ash particles ranging from 700-1,200 kg/m$^3$ to 2,600-3,200 kg/m$^3$ depending on the particular composition of the volcanic ash. In general, the volcanic ash includes oxides and other salts of various metals, silica, and other elements. In certain embodiments, the volcanic ash may be ground to a range of nanoparticles of a median particle size of about 21 nanometers.

Following size reduction, a suspension or emulsion of nanometer size particles of volcanic ash is prepared in a suitable carrier fluid. One suitable carrier fluid is dilute aqueous acetic acid. In one exemplary embodiment, the suspension was prepared in 0.01 molal acetic acid; in another embodiment, 0.1 m acetic acid was used, both of which have a pH between 3 and 4. The suspension was coated onto the conductive layer by using a doctor blade and subsequently dried to form the mesoporous oxide layer 140 containing uniformly distributed nanoparticles of volcanic ash. The layer 140 may be deposited at a thickness of between about 100 and 300 µm in thickness. The suspension may be coated onto the conductive layer by other suitable coating methods such as spin, dip, or spray coating. Preferably, the mesoporous oxide layer 140 is also provided with a thickness of less than 400 µm.

The volcanic ash in the layer 140 is then exposed to an organic dye such as an organometallic complex or a green chlorophyll derivative, by the additional coating of the photoactive mesoporous oxide layer 150 containing dye molecules. The layer 150 may be deposited at a thickness of between about 100-300 µm. In the formulation of the coating for layer 150, a variety of other natural dyes may alternatively or additionally be utilized, such as raspberry extract, provided that they include a chemical group that can attach to the surfaces of the volcanic ash nanoparticles and have energy levels at the proper positions necessary for electron injection and sensitization. Without wishing to be bound to any particular theory, the Applicant believes that the layers 140 and 150 are combined via diffusion to form layer 140/150, such that a single layer of dye molecules attaches to each particle of the volcanic ash and acts as the absorber of light.

The layer 160 of electrolyte with redox mediators such as iodine solution is then coated onto the volcanic ash/mesoporous oxide layers 140/150. The coating may be formulated using iodine-based electrolytes with an iodine concentration of 0.5M. Variations of this electrolyte may be used such as 1-methyl-3-ethyl-imidazolium iodide (MEII). Electrolyte additives may also be utilized such as 4-tert-butylpyridine, pyridine derivatives such as 4-tert-butylpyridine (TBP) and N-methylbenzimidazole (NMBI). The electrolyte mixture may also be enhanced by coadsorbents such as decylphosphonic acid (DPA) and hexadecylmalonic acid (HDMA). The layer 160 is applied by suitable coating means. In one exemplary embodiment, the layer was applied by drilling a hole with a mini-diamond head bit in the back of the FTO glass substrate panel while irrigating with deionized water to avoid cracking of the glass. The electrolyte solution was then injected into the hole. In embodiments in which the electrolyte is in a thicker paste form, a doctor blading method may be utilized to apply the layer 160 at a thickness of between about 100-300 µm in thickness. The liquid electrolyte (e.g., iodine) contained therein percolates into the layers 140/150 to contact the dye molecules and volcanic ash nanoparticles. Preferably, the electrolyte layer 160 is also provided with a thickness of less than 400 µm.

A separator layer 170 is then applied to the layers 140/150 in order to seal in the liquid electrolyte and to maintain integrity and moisture within the cell 112. The separator layer 170 may be formulated using a thermoplastic or similar material, at a thickness of between about 100-300 µm in thickness. The cell 112 may then be completed by deposition of the second electrically conductive layer 190 containing a transparent conducting oxide as a second electrode. In certain embodiments, a catalyst layer 180 comprised of graphene, graphite, elemental carbon, or platinum may be deposited on the separator layer 170 before application of the second electrode 190. The catalyst layer 180 may be formulated using graphene nano-powder with an average thickness of less than 3 nm (i.e., between 3-8 graphene monolayers) and a lateral dimension in the range of 2-8 microns. The catalyst material may be mixed with N-Butyl acetate or similar solvent, and applied at a thickness of between about 100-300 µm by a doctor blade, or other suitable coating means such as spin, dip, or spray coating. Preferably, the catalyst layer 180 is also provided with a thickness of less than 400 µm.

The operation of a dye sensitized solar cells of the present disclosure will now be described, also with reference in particular to the cell 112 of FIG. 2. Without wishing to be bound to any particular theory, the Applicant hypothesizes that electrical energy is generated by the cell 112 according to the following process:

a. Photons from incident light 2 are absorbed by photosensitive dye molecules that are adsorbed on the surfaces of the nanoparticles of volcanic ash/mesoporous oxide layer 140/150.

b. The photosensitive dye molecules are excited from the ground state (S) to an excited state (S*) having an electron-hole pair. The excited electrons are injected into the conduction bands of the volcanic ash electrode constituent(s) (V). This results in the oxidation of the photosensitive dye molecules (S$^+$), as per the following equations:

$$S + h\nu \rightarrow S^* \quad (1)$$

$$S^* \rightarrow S^+ + e^-(V) \quad (2)$$

c. The injected electrons in the conduction band of volcanic ash constituents are transported between the volcanic ash nanoparticles via diffusion toward the back contact (TCO), i.e. the first electrode 130. The electrons flow through an electrical circuit that may include a load 4, and reach the counter electrode, which may be comprised of a layer 180 of graphene (G) that is contiguous with the second electrically conductive layer 190.

d. The oxidized photosensitive dye molecules (S$^+$) accept electrons from the iodine ion (I$^-$) redox mediator in layer 160, leading to regeneration of the ground state (S), and the I$^-$ is oxidized to the oxidized state of triiodide ions, I$_3^-$:

$$S^+ + e^- \rightarrow S \quad (3)$$

e. The oxidized redox mediator, I$_3^-$, diffuses toward the graphene (or alternatively, graphite, carbon, or platinum) of the counter electrode. The graphene functions as a catalyst to reduce the I$_3^-$ triiodide ions to iodide ions I$^-$:

$$I_3^- + 2e^- \rightarrow 3I^- \quad (4)$$

The Applicant further believes that the efficiency of the cell 112 and method of use thereof depends on four energy levels of the component materials thereof: the excited state and the ground state of the photosensitive dye molecules, the Fermi level of the constituent(s) of the volcanic ash electrode, and the redox potential of the mediator ($I^-/I_3^-$) in the electrolyte.

EXAMPLES

Certain exemplary embodiments of the Applicants DSSC devices have been fabricated. It is to be understood that the example devices disclosed below are to be considered exemplary and not limiting. The Applicants believe that the devices have increased energy conversion efficiencies due to the replacement of titanium dioxide with volcanic ash in the photoactive mesoporous oxide layer containing dye molecules, and the utilization of graphene as a catalyst layer in the counter-electrode.

Example 1

Samples of volcanic ash from different sources were chosen to be incorporated into a DSSC device of the present disclosure, replacing the $TiO_2$ constituent. The volcanic ash originated from the site of four distinct sources:

Mount St. Helens, Washington State, USA (collected during a field study on May 18, 1980)

Eyjafjallajokull Glacier, Volcanic Eruption Apr. 14-20, 2010 Iceland

Grimsvotn Volcanic Eruption May 21-25, 2011 Vatnajokull, Iceland

Volcanic ash and ejectile, Lagoa lava field, collected Aug. 22, 2014 Sao Miguel Island, Azores A colloidal suspension of ash ground to a nanoparticle size distribution, as disclosed previously herein, from each sample was produced. The ash suspension was prepared in 0.01 molal acetic acid, and applied and spread in a uniform thickness on a panel area of 2.54 cm×2.54 cm to form a mesoporous oxide layer in all device samples. The suspension was annealed to the conductive panel by heating the panel in a lab furnace at 450 degrees Celsius for half an hour. An organic dye was extracted from raspberries and applied to the ash layer as the photoactive layer containing dye molecules. The organic dye percolated into the ash layer, creating a uniform coating. Control cells having the form of a conventional DSSC utilizing $TiO_2$ and carbon for comparative analysis were produced under similar conditions.

Two types of secondary conductive slides, one coated with carbon, the other with CVD monolayer graphene on a glass substrate square of 1 inch×1 inch were used and sandwiched with the volcanic ash DSSC substructure to produce two different prototype cells. Iodine solution (redox mediator) was injected between the slide assemblies for each of the two prototypes. Through capillary action, the redox mediator solution coated the interior of the slides. The final layers of the volcanic ash DSSCs for each prototype were added, and the two prototypes were tested against the $TiO_2$ conventional cell.

Controlled testing of experimental solar cells was conducted under calibrated lighting conditions using a solar simulator. The output power of the simulator used during cell testing was 132 W. A reference silicon solar cell was used to ensure proper working conditions of 1 Sun. A 150 W Xenon lamp along with a light source was used to illuminate the cells. Electrical contacts were made using alligator clips to the working and counter electrodes. Testing a cell involved scanning from 0V to 1V while measuring the current, scanned at a rate of 100 mV/s. Open current voltage and closed current output were recorded and noted at several intervals. Measurements of full current-voltage (I-V) curve were made.

For both the volcanic ash/carbon prototype and the volcanic ash/graphene prototype, the tests demonstrated a marked increase in power efficiency over the conventional $TiO_2$ DSSC model. Both the volcanic ash/carbon prototype and the volcanic ash/graphene prototype produced open and closed circuit voltages in the general range of 0.27 to 0.31 VDC, compared to a general range of 0.15-0.20 VDC in the conventional $TiO_2$ DSSC. Testing in sunlight established similar differences with an average range of 0.34 to 0.43 VDC in the volcanic ash/carbon prototype and the volcanic ash/graphene prototype, and 0.22 to 0.25 VDC in the $TiO_2$ control device.

Example 2

A prototype DSSC device comprised of a proportional mixture of volcanic ash and titanium dioxide was constructed, containing 20 weight percent $TiO_2$, 40 weight percent volcanic ash from Mt. Saint Helens, and 40 weight percent volcanic ash from the Grimsvotn Volcanic Eruption. A colloidal suspension was prepared in 0.01 molal acetic acid. The colloidal suspension of the 20/40/40 semiconductor formula was applied to a conductive plate substrate and spread in a uniform thickness of approximately 1 mm. The emulsion was annealed to the substrate, and had a final thickness of about 100-300 μm. An organic dye was extracted from raspberries and applied to the ash/$TiO_2$ layer as the photoactive layer containing dye molecules.

A CVD monolayer-graphene-on glass-substrate was utilized as the counter electrode panel. The final layers of the volcanic ash prototype and the $TiO_2$ control cell were added, and the prototype was tested against the $TiO_2$ control cell under controlled and calibrated conditions.

The prototype performed with positive results, generating 0.30 to 0.44 VDC under the laboratory light source, and generating 0.36 to 0.53 VDC in sunlight, vs. 0.09 VDC and 0.16 VDC for the $TiO_2$ control device in laboratory light and sunlight, respectively. Additionally, the prototype device maintained its integrity, i.e., its output voltage, for a longer period of time and produced stable current patterns under a variety of environmental conditions.

It is therefore apparent that there has been provided, in accordance with the present disclosure, a light energy conversion device, and methods of fabrication thereof. The foregoing description of technology and the invention is merely exemplary in nature of the subject matter, manufacture, and use of the invention and is not intended to limit the scope, application, or uses of any specific invention claimed in this application or in such other applications as may be filed claiming priority to this application, or patents issuing therefrom. The following definitions and non-limiting guidelines must be considered in reviewing the description.

It is to be understood that the headings in this disclosure (such as "Background" and "Summary") and sub-headings used herein are intended only for general organization of topics within the present technology, and are not intended to limit the disclosure of the present technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

To the extent that other references may contain similar information in the Background herein, said statements do not constitute an admission that those references are prior art or have any relevance to the patentability of the technology disclosed herein. Any discussion in the Background is intended merely to provide a general summary of assertions.

The description and specific examples, while indicating embodiments of the technology disclosed herein, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

To the extent employed herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the words "comprise," "include," contain," and variants thereof are intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting ingredients, components or process steps, the Applicants specifically envision embodiments consisting of, or consisting essentially of, such ingredients, components or processes excluding additional ingredients, components or processes (for consisting of) and excluding additional ingredients, components or processes affecting the novel properties of the embodiment (for consisting essentially of), even though such additional ingredients, components or processes are not explicitly recited in this application. For example, recitation of a composition or process reciting elements A, B, and C specifically envisions embodiments consisting of, and consisting essentially of, A, B, and C, excluding an element D that may be recited in the art, even though element D is not explicitly described as being excluded herein.

Having thus described the basic concept of the invention, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly stated in the claims.

What is claimed is:

1. A dye-sensitized solar cell comprising:
    a) a first electrically conductive layer;
    b) a mesoporous oxide layer contiguous with the first electrically conductive layer and comprised of volcanic ash particles and photoactive dye molecules adsorbed on the ash particles;
    c) an electrolyte layer contiguous with the mesoporous oxide layer and comprised of a redox mediator;
    d) a catalyst layer comprised of an electrically conductive catalyst material; and
    e) a second electrically conductive layer contiguous with the catalyst layer.

2. The dye-sensitized solar cell of claim 1, wherein the electrically conductive catalyst material is graphene.

3. The dye-sensitized solar cell of claim 1, wherein the electrically conductive catalyst material is graphite.

4. The dye-sensitized solar cell of claim 1, wherein the electrically conductive catalyst material is platinum.

5. The dye-sensitized solar cell of claim 1, further comprising a light transmissive substrate contiguous with the first electrically conductive layer.

6. The device dye-sensitized solar cell of claim 1, wherein the mesoporous oxide layer is further comprised of titanium dioxide particles.

7. The dye-sensitized solar cell of claim 6, wherein the mesoporous oxide layer is comprised of particles at a ratio of 80 weight percent volcanic ash to 20 weight percent titanium dioxide.

8. The dye-sensitized solar cell of claim 1, wherein the volcanic ash particles are provided as a mixture of particles from different indigenous sources of volcanic ash.

9. The dye-sensitized solar cell of claim 1, further comprising a separator between the electrolyte layer and the catalyst layer.

10. The dye-sensitized solar cell of claim 1, wherein the redox mediator is iodine.

11. The dye-sensitized solar cell of claim 1, wherein the first and second electrically conductive layers are comprised of a transparent conducting oxide.

* * * * *